(12) United States Patent
Oren et al.

(10) Patent No.: US 6,539,387 B1
(45) Date of Patent: Mar. 25, 2003

(54) STRUCTURED FOCUSED HYPERTEXT DATA STRUCTURE

(76) Inventors: Avraham Oren, Klein 1 St., B13, Jerusalem (IL); Rita Margulyan, Ha'arava 15, Givat Sharen, Beit Shemesh (IL); Lev Olkha, Tekoa 46, Tekoa (IL); Nachum Kovalsky, Horkania 33, Jerusalem (IL)

(*) Notice: Subject to any disclaimer, the term of this patent is extended or adjusted under 35 U.S.C. 154(b) by 0 days.

(21) Appl. No.: 08/999,997

(22) Filed: Jul. 7, 1997

Related U.S. Application Data

(63) Continuation of application No. 08/551,929, filed on Oct. 23, 1995, now abandoned.

(51) Int. Cl.$^7$ .................................................. G06F 17/30
(52) U.S. Cl. ............................... 707/100; 707/3; 707/4; 707/5; 707/100; 707/501; 707/515
(58) Field of Search ............................... 707/100, 3, 5, 707/501, 101, 102, 515, 4, 104

(56) References Cited

U.S. PATENT DOCUMENTS

| | | |
|---|---|---|
| 4,905,163 A | 2/1990 | Garber et al. |
| 5,115,504 A | 5/1992 | Belove et al. |
| 5,159,669 A | 10/1992 | Trigg et al. |
| 5,265,065 A | 11/1993 | Turtle |
| 5,295,243 A * | 3/1994 | Robertson et al. .......... 395/160 |
| 5,355,472 A * | 10/1994 | Lewis ......................... 395/600 |
| 5,367,621 A | 11/1994 | Cohen et al. |
| 5,388,196 A | 2/1995 | Pajak et al. |
| 5,404,534 A | 4/1995 | Foss et al. |
| 5,408,655 A | 4/1995 | Oren et al. |
| 5,418,948 A | 5/1995 | Turtle |
| 5,428,731 A | 6/1995 | Powers, III |
| 5,544,354 A * | 8/1996 | May et al. .................. 395/600 |
| 5,553,216 A * | 9/1996 | Yoshioka et al. ........... 395/145 |
| 5,557,722 A | 9/1996 | Derose et al. |
| 5,586,235 A * | 12/1996 | Kauffman ................... 395/761 |
| 5,602,025 A | 2/1997 | Tabb et al. |

* cited by examiner

Primary Examiner—Jean M. Corrielus

(57) ABSTRACT

A structured focused hypertext data structure in which hypertext nodes store identifying information about source and target documents or pages so that their relative positions in a hierarchy and other information can be determined by both a user and a quality control program. The invention facilitates search and navigation through a large multimedia database. The type of information (e.g., graphics, video, utility application) that is contained in a target document or page can also be denoted. A color coding scheme may be used to provide information related to a hyperlink. In a hierarchy, a page may be linked to two or more chapters, or a paragraph may be linked to two or more pages.

13 Claims, 16 Drawing Sheets

Celiac disease

Definition  Celiac disease is a permanent intestinal intolerance to gluten manifested by flattening of mucosal villi, thereby causing malabsorption.

Background  The pathophysiologic mechanism of gluten toxicity is not known, but immune mediation of gluten toxicity is the currently held hypothesis. The etiology includes both genetic and environmental factors. Prevalence is between 1:300 to 1:3000.

Clinical evaluation  The age of presentation differs from country to country. Typically the patient is 1 to 2 years old. Patients usually present with symptoms of failure to thrive, steatorrhea or chronic diarrhea. Physical examination reveals short stature and there may be signs of malnutrition. The abdomen is distended (pot belly) and there is wasting of the limbs and the buttocks. Laboratory tests confirm the presence of malabsorption. The diagnosis is established by a pathological jejunal biopsy. Additional supportive findings include the presence of antreticulin, antiendomysial, and antigliadin antibodies. The differential diagnosis includes other causes of malabsorption such as cystic fibrosis.

Therapy  The only important treatment is a gluten-free diet supported by a comprehensive patient education program.

Prognosis  The outcome is excellent on the diet. Untreated patients run a risk of malignancy.

To receive further information, click on any underlined word
Last revised 3/30/95

FIG. 4

Celiac disease - Etiology and pathogenesis

Etiology  The toxic proteins causing celiac disease have been isolated and termed <u>gliadins</u> (fractions alpha, beta, gamma, and omega).

Pathogenesis  The pathogenesis of celiac disease is not clear. Most of the current research is targeted toward an immunologic abnormality. Both cellular and humoral immunity seem to be involved. Another possibility is a direct cytotoxic effect of gliadin or its metabolites on the intestinal enterocytes.

Current research  The following topics are the main directions of research today:
1. Digestion, processing, and presentation of the gliadin antigen.
2. Cellular immunological studies evaluating the role of lymphocytes in the lamina propria and the intraepithelial lymphocytes.
3. <u>Immunogenetics</u>: the gene for celiac disease is probably located on the short arm of chromosome 6, but the exact site has not yet been found. Furthermore, celiac disease is associated with certain histocompatibility antigens (<u>HLA</u>).
4. Serologic studies of specific antibodies, circulating immune complexes and activation of <u>complement</u>.
5. Data concerning associated diseases and environmental factors.

To receive further information, click on any underlined word
Last revised 3/30/95

FIG. 7

HyperMed & SilverPlatter - CurrentCare in Pediatrics

Celiac disease - Signs

Symptoms and signs in celiac disease are mostly due to fat malabsorption. In severe cases, complications (such as rickets and anemia) are caused by malabsorption of the fat-soluble vitamins.

| | |
|---|---|
| General impression | Apart from the presenting complaint, there may be no physical signs. On the other hand, there may be obvious malnutrition and pallor. |
| Abdomen | The abdomen is distended and tympanitic. |
| Extremities | General hypotonia and proximal muscle wasting, especially wasting of the buttocks. |
| Dental | Enamel hypoplasia - manifested by pitting or grooving of the enamel. |
| Growth charts | Decrease of percentiles of height, weight, and head circumference. Decrease of growth velocities. In younger children the weight is relatively more affected than the height. |

Consider if the physical examination is compatible with any of the following conditions:

| | |
|---|---|
| Autoimmune | Liver, thyroid, eye, connective tissue, rheumatic, and pulmonary. |
| Associated | Dermatitis herpetiformis and Down's syndrome. |
| Complications | Malignancy and deficiency states. Signs of vitamin deficiencies may include glossitis, carpopedal spasm, absent tendon reflexes, and cutaneous bruising. |
| Rare findings | Delayed puberty, oral ulcerations. |

To receive further information, click on any underlined word
Last revised 3/28/95

FIG. 8

Paragraph Form

Cough

Acute
- Upper airway
- Lower airway
- Parenchymal

Chronic
- Upper airway
- Lower airway
- Parenchymal
- Unspecified

CD-ROM | EDIT

Go to Paragraph: Prev. / Next

Top: 0  Left: 0  Space after: 0

Assign algorithm | Delete assignment

Algorithm Editor

Algorithm name: Cough

Paragraph style: Algorithm

Fig. 16

STRUCTURED FOCUSED HYPERTEXT DATA STRUCTURE

This is a continuation of application Ser. No. 08/551,929, filed Oct. 23, 1995 now abandoned.

A portion of the disclosure of this patent document contains material which is subject to copyright protection. The copyright owner has no objection to the facsimile reproduction by anyone of the patent disclosure, as it appears in the Patent and Trademark Office public patent files or records, but otherwise reserves all copyright rights whatsoever.

BACKGROUND OF THE INVENTION

This invention relates generally to data structures for large hierarchical multimedia databases. More particularly, the present invention relates to a structured focused hypertext data structure in which hypertext nodes store identifying information about source and target documents or pages so that the relative positions in the hierarchy of the source and target documents as well as other information about the documents may be determined and utilized by both the user and a quality control computer program.

Hypertext is a well known concept and tool by which one document is linked to one or more other documents. Users access a desired, target document from a currently displayed, source document by selecting a portion of text which has some relationship to the target document and which has been visually distinguished as hypertext such as with the use of underlining or bolding. The link between documents is established in advance by the use of an anchor inserted before or near the hyperlinked text in the source document which contains the address of the target document. Hypertext is widely used in many commercially available products, including in Windows®-based software products and help files available from Microsoft Corporation of Redmond, Wash., and in the World Wide Web accessible through the Internet which utilizes Hypertext Markup Language, or HTML.

The manner in which hypertext is used in these and many other currently available software products is represented generally in the diagram 10 shown in FIG. 1. Each circle 12 in this diagram represents a document or page of information, commonly referred to as a "node," which contains one or more hypertext links to other pages, as shown by the lines 14 connecting the nodes. The arrows in the diagram 10 represent hypertext links to additional nodes not shown in the diagram. The diagram 10 in FIG. 1 loosely takes the form of a web, with hypertext links extending from nodes in an unorganized and unstructured manner.

Hypertext is advantageous because it is easy to use and mirrors the associative thought processes of users. However, currently available hypertext systems contain several problems which have prevented hypertext from becoming the primary search tool for many developers of large multimedia databases. One problem with existing hypertext systems is that users seeking a specific bit of information contained in one node often need to jump from node to node in an essentially undirected and unfocused manner until reaching the node containing the desired information. Users have little assurance that they are getting closer to the desired information as more jumps are made, and can easily get sidetracked into nodes located far from the desired node.

Furthermore, hypertext alone provides little guidance as to what type of the information users will receive after jumping to another document. For example, users may wish to see a photograph, graphical image, or motion video rather than text, but have no way of knowing based on the presence of a hypertext link whether the target document contains such information. As a result they are often required to jump to the other document just to discover whether it contains useful information of a desired type, and to return to the source document afterwards to continue searching for a more appropriate hypertext connection. To convey information to users regarding the type of information contained in a target document, the author of the source document needs to insert additional text (such as "click here to see picture") or a graphical image such as an clickable icon indicating the type of information contained in the target document. This provides additional work and inconvenience for the author, and the additional text or graphical image will become inaccurate if the information contained in the target document is changed.

Another well-known problem with the hypertext system represented by the diagram 10 of FIG. 1 is the tendency for users to feel lost after several hypertext jumps. As a result, users are often required to backtrack through previously visited nodes or to refer to lists of previously visited sites to find their way.

Clearly, these problems with current hypertext systems grow exponentially with the number of hypertext links used. The number of hypertext links appearing in any given document must therefore be limited in existing systems, and these simple hypertext systems usually contain an average of about two-three links per page. Thus, in order to effectively browse through a large number of separate pages of information (by eliminating hypertext link choices), for example, 2000 pages, a user would need to make about seven hypertext jumps ($3^7=2187$), whereas if each page contained 10 hypertext links, a user would only need to make about three or four jumps. The necessary limitation on the number of hypertext link in existing hypertext systems because of the exponential growth of the problems discussed above thus further limits the capability of hypertext to serve as a primary database search tool.

These problems are particularly prevalent in the design of large multimedia databases containing a large volume of information (e.g., 2,000–10,000 pages) of a technical nature, such as medical information, which is constantly changing and needs to be updated on a regular basis. Doctors must be able to quickly access key, up-to-date medical and patient information while visiting with a patient, and must keep abreast with a vast volume of current medical literature. The best way in which to provide access to this information is in the form in which doctors think, i.e., by associative thinking. However, because of the problems described above, existing hypertext systems are inadequate to serve as a comprehensive search mechanism for a large medical multimedia database.

An additional problem faces designers of a large medical database for use by doctors. Medical knowledge may be broken into types or categories (e.g., diseases, tests, and procedures) and each of these types may be further broken down into subtypes. These types and subtypes may be useful in designing a hierarchical database. However, certain medical knowledge may be accurately categorized in many ways. For example, celiac disease may be categorized as both a digestive disorder and an immunodeficient disorder. Furthermore, doctors may otherwise disagree on how to categorize many parts of medical knowledge. Thus, the usefulness of such categorizations in a hierarchical database is severely limited. Applicant(s) are unaware of any existing medical or other type of large database which uses categorizations but accounts for possible differences in categorization.

The present invention substantially solves these problems and provides the heretofore missing data structure for a large multimedia database which provides for hypertext to be used in a structured, focused manner so that users can quickly find specific bits of information using a natural associative thinking process.

SUMMARY OF THE INVENTION

It is an object of the present invention to solve the problems described above associated with existing hypertext systems.

It is another object of the present invention to facilitate search and navigation through a large multimedia database.

It is another object of the present invention to provide a method of informing users of a large database organized in a hierarchical fashion of the relative position in the hierarchy of a page or document targeted by a hypertext link as compared to a currently displayed source document or page.

It is another object of the present invention to provide a method of informing users of a multimedia database of the type of information contained in a document or page which is the target of a hypertext link without the need to add additional text or graphics to the source document.

It is another object of the present invention to provide a method for automatically checking the quality of the hypertext links in a large hierarchical database according to a predetermined set of protocols.

It is another object of the present invention to provide a hierarchical data structure for a large database in which chapters are divided into categories and in which different ways of categorizing chapters are accounted for in the hierarchy.

In achieving the above and other objects, the invention provides a hierarchical hypertext system in which one or more of the following may be determined: the relative positions in the hierarchy of related data units linked by a hypertext link; the presence of graphics in one or both of the data units; and the presence of a utility application in one or both of the data units. In one embodiment, hypertext linked data units may also be linked with a database, which enables any desired information in the system relating to a linked data unit to be provided to the user, and provides the capability of performing quality control testing on the quality of the hypertext links and database structure.

In the preferred embodiment, the relational or other information provided by the system is visually indicated on a displayed hypertext link by a color coding scheme, which may take any suitable form, or by a bolding, highlighting or other suitable visual scheme.

Other visual (or audio-visual) schemes will be apparent to those of skill in the art from the disclosure herein.

The invention provides a data structure, methods and systems as described herein. In a hypertexted data structure according to the invention, the data structure is stored on a computer readable memory device organized in a hierarchy of at least two levels, and comprises a plurality of data units, such as paragraphs, screens or pages, or chapters, positioned at different levels in the hierarchy, each containing at least some textual information and a plurality of hypertext links each linking at least part of the textual information in a given source data unit to a target data unit. At least one of the hypertext links is linked to at least one hypertext node which contains information relating at least to both the given source data unit and the target data unit. According to one embodiment, the linking is such that the relative positions in the hierarchy of the given source and target data units linked by the hypertext link may be determined. In another embodiment, the data structure comprises a database containing information relating to the data units; and the linking is such that the at least one hypertext node is linked to the data base.

In another embodiment, the hierarchical data structure comprises a plurality of first data units representing pages positioned at different levels in the hierarchy, each containing information, a plurality of second data units representing chapters positioned at different levels in the hierarchy, each containing at least one page or other chapter, and a plurality of links linking each of a plurality of pages simultaneously to two or more chapters, one chapter of which is labeled as a default chapter for each page.

The at least one hypertext node may be, for example, a data record in a database file or a separate file. Preferably, there are a plurality of hypertext node types each linked to a hypertext node, the hypertext node types including at least one of the following node types: (a) a node type linked to each hypertext node determined by the relative positions of the given source data unit and target data unit; (b) a node type linked to each hypertext node determined by the presence of graphics in the given source data unit, in the given target data unit, or in both the given source and target data units; and (c) a node type linked to each hypertext node determined by the presence of a utility application in the given source data unit, in the given target data unit, or in both the given source and target data units.

In the preferred embodiment, the hypertext node types comprise a set of visual indicators to be displayed on a display device connected to a computer reading the memory device, each visual indicator representing a different node type, for example, different colors displayed in association with textual information displayed at least as part of the respective data unit.

The data units may comprise pages and chapters, each chapter being linked to one or more pages. At least one hypertext link may link each chapter to each of the one or more pages linked to that chapter. Further, at least one page may be linked simultaneously to two or more chapters, one chapter of which is labeled as a default chapter for the at least one page.

The data structure may be organized in a hierarchy more than two levels, e.g., three or more levels. In a three level hierarchy, the data units may further comprise paragraphs, each paragraph being linked to one or more pages, and wherein at least one paragraph is simultaneously linked to two or more pages.

A method according to the invention structures a database which is stored in a memory device organized in a hierarchy of at least two levels such that the hierarchical relationship may be automatically retained when the database is changed. The method comprises positioning a plurality of data units at different levels in the hierarchy, each containing at least some textual information, creating a data base containing information relating to the data units, hypertext linking at least part of the textual information in a given source data unit to a target data unit such the relative positions in the hierarchy of the given source and target data units which are hypertext linked link may be determined, and further linking the linked source and target data units to the database.

Another method according to the invention structures a database stored in a memory device so as to provide a user the ability to quickly locate desired information stored within the database. This method comprises establishing a hierarchical structure for the information in the database, the hierarchical structure comprising one or more chapter levels and a plurality of pages, each page containing textual information, hypertext linking at least part of the textual information in every page in the database with at least one chapter level such that the relative positions in the hierarchy of given page and a given chapter level linked by the hypertext link may be determined, and hypertext linking at least part of the textual information in at least one page with at least one other page.

A computer system with which the present invention may be used includes computer hardware comprising at least one each of a processor, memory device, display, and input device. In a preferred embodiment, the hardware comprises a central processing unit, a plurality of memory devices of different types including one or more RAM memory devices, ROM memory devices, and other magnetic or optical memory devices and readers such as hard disks and hard disk drives, floppy disk drives, or CD-ROM drives, a display monitor, and a plurality of possible input devices including a keyboard, mouse, electronic stylus with digitizer tablet, microphone with voice recognition software, or touch screen. All of these elements and the manner in which they are connected are well-known in the art. In addition, one skilled in the art will recognize that it is not necessary for all of these elements to be connected in a single unit such as a personal computer, but may be connected in a mainframe environment or over a network or via other communications links. The computer system is operated by any conventional operating system, including the MS-DOS® or Windows® operating systems available from Microsoft or the System 7 operating system available from Apple Computer of Cupertino, Calif.

BRIEF DESCRIPTION OF THE DRAWINGS

The file of this patent contains at least one drawing executed in color. Copies of this patent with color drawing (s) will be provided by the Patent and Trademark Office upon request and payment of the necessary fee.

The invention is illustrated in the figures of the accompanying drawings which are meant to be exemplary and not limiting, in which like references refer to like or corresponding parts, and in which:

FIGS. 4–8 are examples of screen displays of a medical database in accordance with a preferred embodiment of the resent invention, in which:

FIG. 4 is a page titled "Celiac disease";

FIG. 5 is a table of contents screen displayed after a user has clicked on the "Table of Contents" icon in the toolbar of the screen shown in FIG. 4 and then on the icon selecting the advanced table of contents;

FIG. 6 is a table of contents screen displayed after a user has clicked on the chapter titled "Secondary deficiency of complement" in the upper left box in the screen shown in FIG. 5, which box contains a list of all chapters that contain the chapter Celiac disease;

FIG. 7 is a page titled "Celiac disease—Etiology and pathogenesis"; and

FIG. 8 is a page titled "Celiac disease—Signs";

FIGS. 9–14 are screen displays demonstrating the process of creating and editing a hierarchical data structure in accordance with a preferred embodiment of the present invention, in which:

FIG. 9 is a "Paragraph Form" screen in which paragraphs can be created and edited and in which hypertext links are established;

FIG. 10 is a "Page—Paragraph listings" screen in which the page structure can be created and edited;

FIG. 11 is a "Page Editor" screen in which are presented the options for placing a page within the hierarchy of the database structure;

FIG. 12 is a "Chapter Editor" screen presenting the options for placing a chapter within the hierarchy of the database structure;

FIG. 13 is a "Move/Copy a Node" screen in which users may move or copy a chapter from one part of the database hierarchy to another; and FIG. 14 is a "Delete Node with children and 1 parent" screen in which users may delete a chapter from the database hierarchy;

FIG. 16 is a "Paragraph Form" screen display of a preferred embodiment of the present invention in which Algorithms can be placed within or removed from the data structure.

DETAILED DESCRIPTION OF THE PREFERRED EMBODIMENTS

The preferred embodiments of the present invention will be described herein with reference to the drawings in the figures and the computer program listings contained in the Source Code Appendix. The Source Code Appendix contains source code written in the Visual Basic programming language, a compiler for which is available from Microsoft Corporation of Redmond Wash. The Source Code Appendix forms part of this application and is incorporated herein, and contains pages which are numbered separately according to the scheme "An" where n goes from 1 until the end of the Source Code Appendix. Those skilled in the art will recognize that many other programming languages may be utilized to implement the present invention, such as C++ and Delphi.

A preferred embodiment of the present invention is incorporated in a medical multimedia database available on CD-ROM from HyperMed of Jerusalem, Israel under the trademark HyperMed-Pediatrics or from SilverPlatter Information Inc. of Norwood, Mass. under the trademark CurrentCare™ in Pediatrics. Many of the screen displays shown in the figures are taken from this product, and the description of the preferred embodiments relates to this product.

The computer hardware used in connection with the preferred embodiments is either an IBM-compatible personal computer environment or a Macintosh® environment available from Apple Computer of Cupertino, Calif. The IBM-compatible environment of the preferred embodiment comprises a 80386 model central processing unit or higher (with a 80486 model CPU or higher preferred) operating at 33 MHz or higher, a color VGA display monitor, at least 8 MB of RAM memory, a hard disk accessible locally or over a network, a double-speed CD-ROM drive, a keyboard, and a mouse. The IBM-compatible environment requires the use of the Windows operating system. Those skilled in the art will recognize that the present invention is not limited to the use of this hardware or these types of computer systems, but can be practiced on many different types of computer systems and environments.

Figure 1:
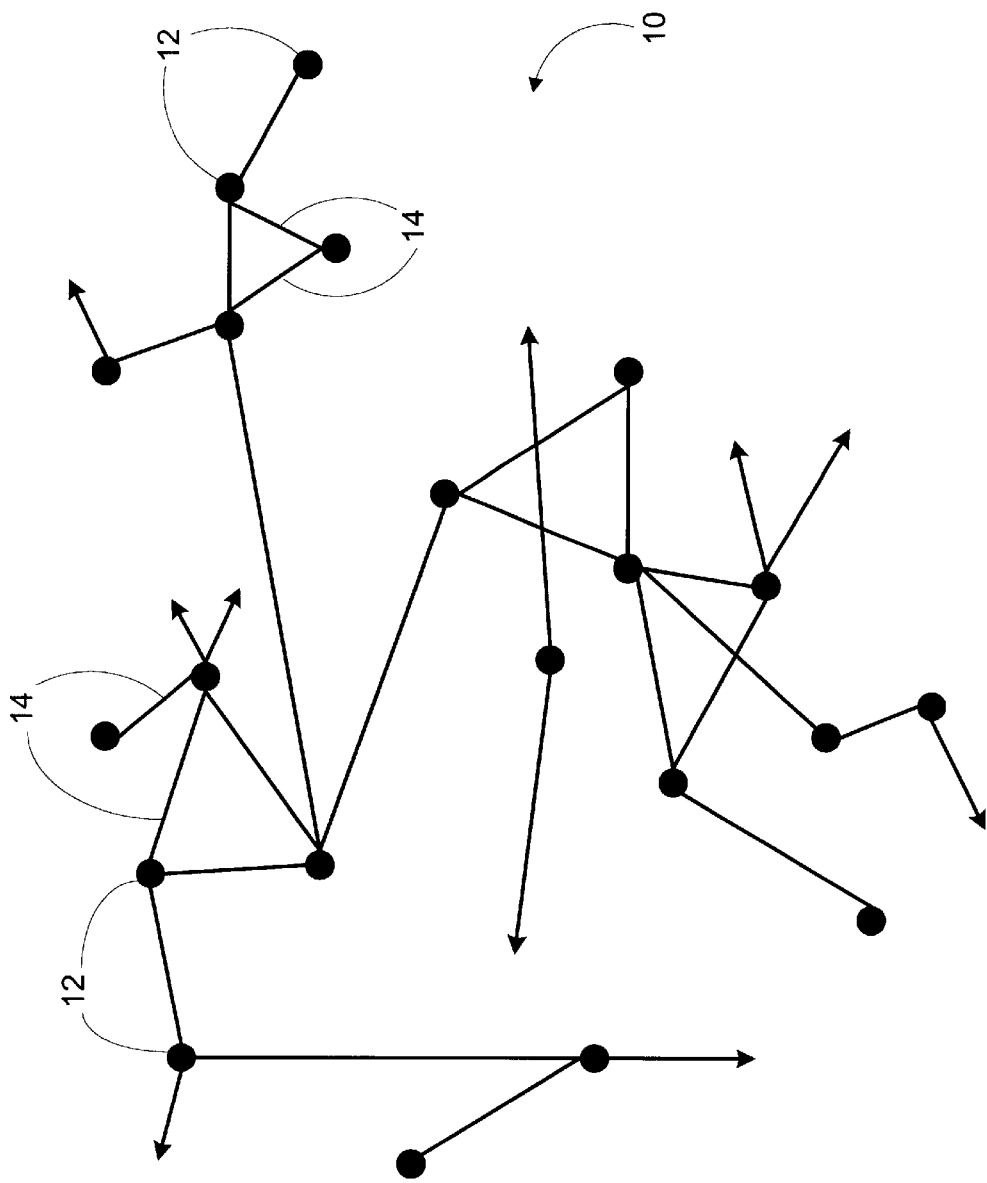
FIG. 1 is a diagram representing the structure of prior art hypertext systems.
Figure 2:
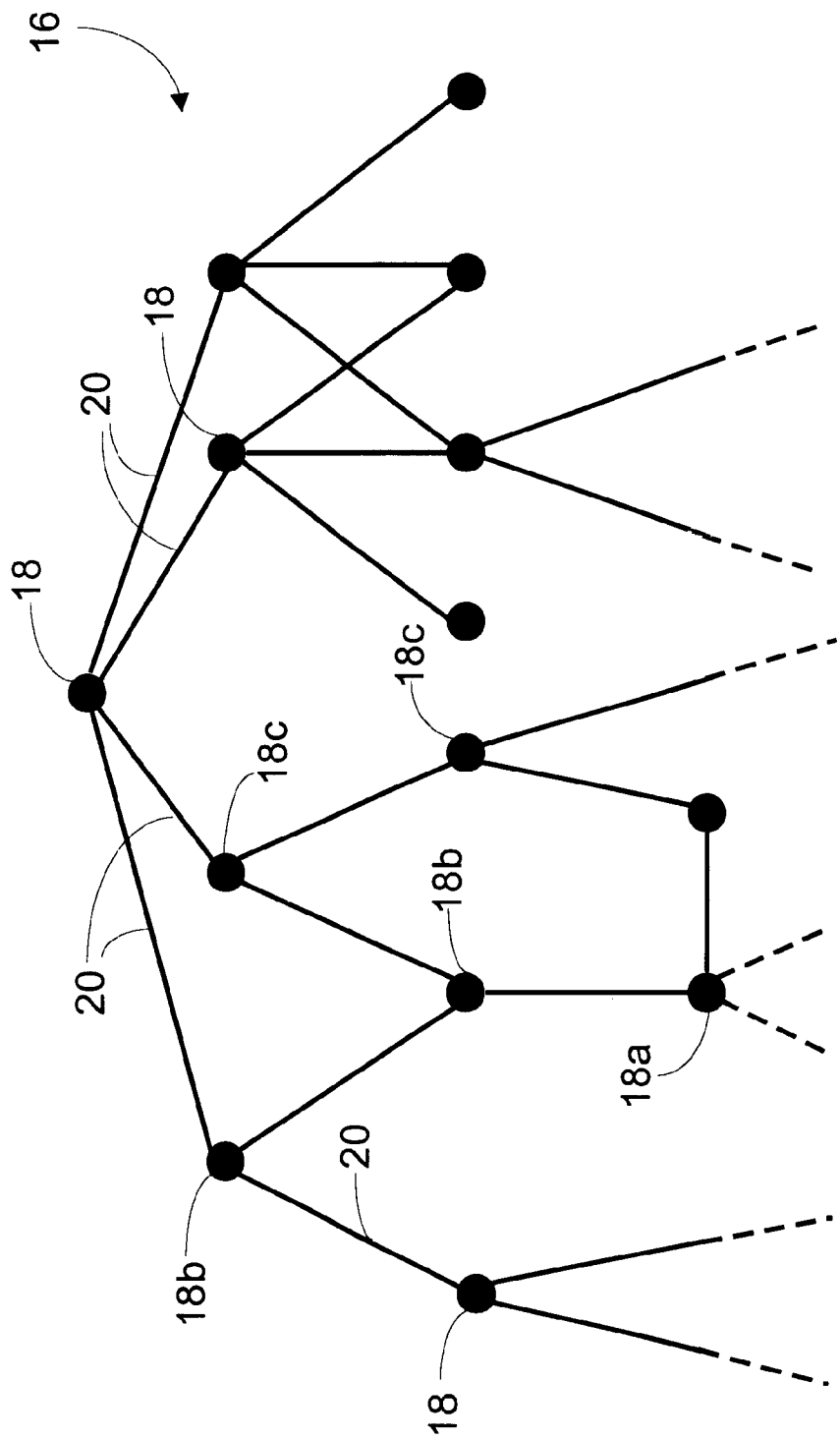
FIG. 2 is a diagram representing a hierarchical, multi-parent data structure of the present invention.

FIG. 2 is a diagram 16 representing the database structure of a preferred embodiment of the present invention, with the circles 18 representing documents or pages containing information and the lines 20 representing connections between the pages 18. The pages are organized in a hierarchical fashion—each page is assigned to a level in the hierarchy and connections or links are made between pages at one level and related pages at other levels. The hierarchy is organized as chapters, one or more levels of subchapters, and pages within the chapters or subchapters. The terms parent and child are used herein to indicate a direct relationship between pages or chapters in two consecutive levels in the hierarchy.

As shown in the diagram 16 (FIG. 2), a page or chapter may be a child to more than one parent, i.e., a page or chapter may have multiple parents. For example, the page represented by 18a has two parents 18b and 18c. The page 18a can therefore be accessed through either of the two parents, and can be shown in a table of contents as a page appearing within either chapter. Similarly, the subchapter 18b is a child of multiple parents 18d and 18e.

In the database structure of the preferred embodiments, the basic data unit is a paragraph (other data units include pages or screens, subchapters, and chapters), which consists of text, graphical images, charts, motion video, audio, or any other types of information content. As shown in the Paragraph table 22 in the database structure 20 shown in FIG. 3, each paragraph has at least a unique identifier ("ID") (indicated to be unique by the use of bold font), a header or title, and a body (e.g., paragraph body text) consisting of the content to be displayed to a user. Each paragraph is linked in the database (via standard database linking structures) to a Link Table between Screen and Paragraph ("Link Table") 24, which stores the connections between each paragraph (each child paragraph) and the screen(s) on which the paragraph appears, i.e., its parent screen(s). The use of the "1" and "∞" symbol at either end of the line 26 connecting the Paragraph ID field or entry in the Paragraph table to the Child Paragraph ID in the Link Table indicates that these fields are connected in a one-to-many relationship, i.e., the Child Paragraph ID can store many Paragraph IDs. As a result, one page or screen can be linked to many paragraphs, i.e., many paragraphs can appear on each screen. See, for example, FIG. 4.

Similarly, the Screen ID # field in the Screen table 28 is connected in a one-to-many relationship with the Parent Screen ID field in the Link Table 24, thus providing that a given paragraph can be connected and can appear in more than one screen. This establishes a multiple parent relationship, of the type described above, between paragraphs and screens, because each paragraph can have more than one parent screen.

In the preferred embodiments, each screen or page is limited to contain only as much information, i.e., only as many paragraphs, as can be displayed at one time on a display. This is implemented by storing the paragraph height for each paragraph in the Paragraph table. This presents all the information in a screen to the user at once, and avoids the need for the user to scroll down the screen in order to see additional information. See, for example, the screen displays shown in FIGS. 4, 7, and 8. Some screens or pages provide access to utility application programs, such as a growth chart (used to calculate a rate of growth for a given patient) and a pharmacology calculator.

The Screen ID # field in the Screen table 28 is also connected in a one-to-many relationship to the Links to Screen ID field in a Subchapter List 30, which stores the links between the subchapters (the word "subchapter" being used in this relationship chart to signify pages) and chapters. As a result, a given screen or page can serve as a subchapter in more than one different chapter. This establishes a multiple parent relationship between subchapters and chapters, as described above. In addition, the Chapter ID field in the Subchapter List 30 is connected in a one-to-many relationship with the Chapter ID field in a Table of Chapters 32, thus providing that a given chapter can have many subchapters.

In the preferred embodiments, each chapter is assigned a chapter type, which is stored in the Table of Chapters 32 (Type of chapter field). These types are categories into which the whole of knowledge in a given field may be broken down. In the medical field of the database of the preferred embodiment, the chapter types and the nature of the information contained in each type are:

1. Disease—a situation of illness, having an etiology, pathogenesis, classical symptoms, signs, laboratory tests, specific therapy, and prognosis;
2. Problem—a single abnormal finding, one which is either a symptom, a sign or a laboratory test. This chapter type includes the following elements: the differential diagnosis, the approach to the problem, focused history taking, and physical examination in order to make a diagnosis and to do or order the appropriate laboratory tests;
3. Laboratory Tests—a specific method to do a laboratory test and method for interpreting results;
4. Procedure—part of an investigation or therapeutic procedure, specific indications, and contraindications, and specific techniques to perform the procedure.
5. Drug—any physical or chemical mode of therapy given into or onto the patient, pharmacological action, preparations, indications, dose, side effects, and precautions.

In addition, the help files are considered a chapter type, so that accessing the help files appears the same to the user as accessing the rest of the database, and so that the help files can have the same advantages provided by the present invention as the rest of the data structure.

As discussed above, a given topic may accurately be categorized in two or more ways, or differences in opinion may exist regarding how to label the given topic. Such a topic would be placed under multiple parents so that it is accessible by a user from either type of chapter. Multiple parenting can also be used to place one chapter or page within two or more chapters concerning different subjects, such as pneumonia would belong to both lung disease and infectious disease.

Figure 3:
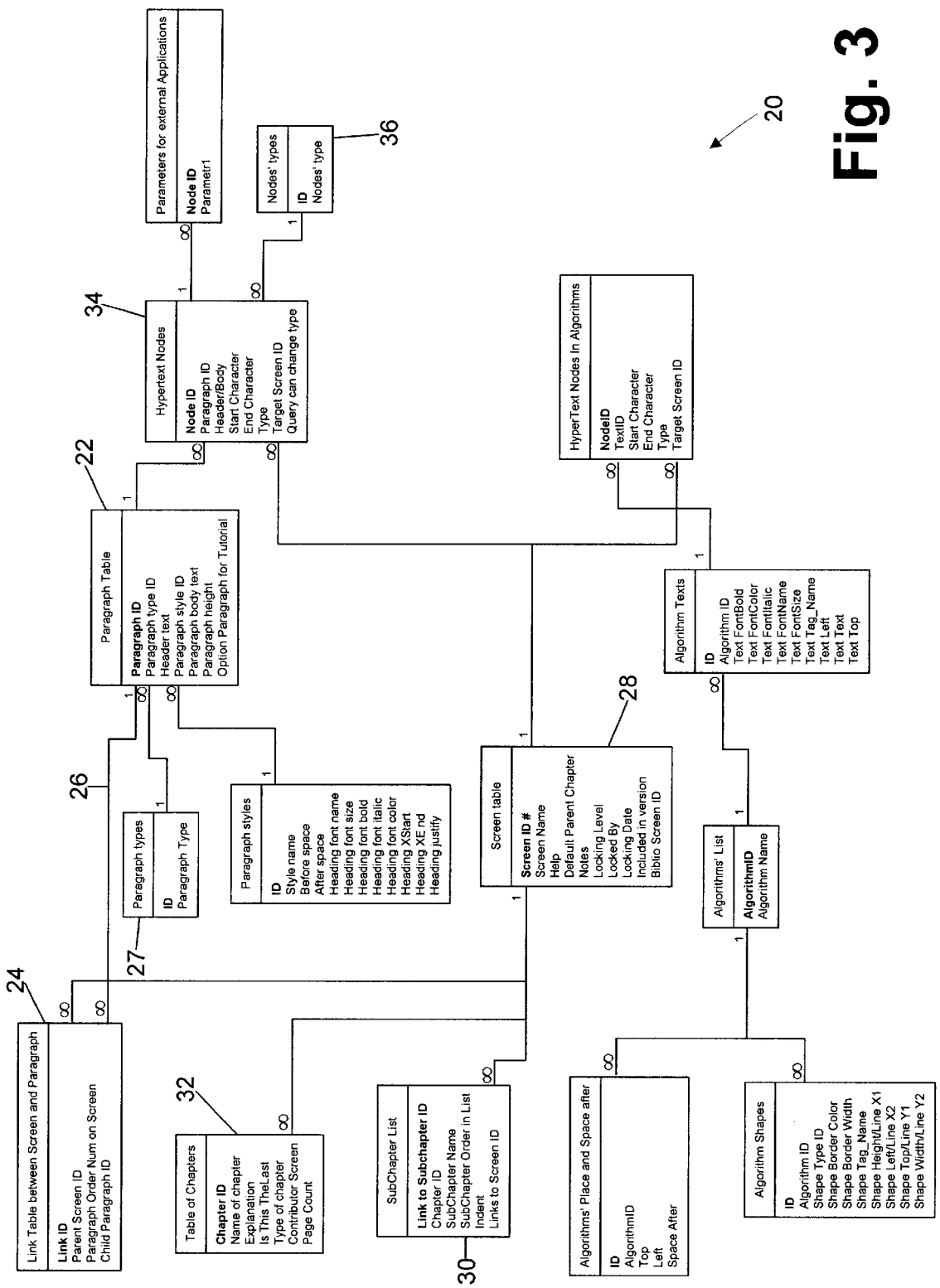
FIG. 3 shows the relationships between the database files in the data structure of one preferred embodiment of the present invention.

Each paragraph is also assigned a type, which is stored in the Paragraph table shown in FIG. 3. The choice of paragraph types varies depending upon the type of chapter, and these choices are stored in the Paragraph types table 27 and linked to the Paragraph table 22. For example, a disease type chapter has paragraph types including those shown as headings in FIG. 4. The use of these chapter and paragraph types provides the capability to perform a keyword search for a word or term limited to a specific type of chapter or paragraph, or to limit a search through an index to a specific type of chapter or paragraph.

FIGS. 4–8 illustrate the database connections established by the tables and links as just described. FIG. 4 shows a page or screen titled "Celiac disease." This page contains five different paragraphs, having the headings "Definition", "Background", "Clinical Evaluation", Therapy", and "Prognosis."As explained above, these headings represent different paragraph types, which can be used as parameters to limit the scope of searches through the database. As explained above, these paragraphs can be linked to and appear in other pages as well, so that the same information is available in other locations in the database without the need to store an additional copy of the paragraph.

Figure 5:
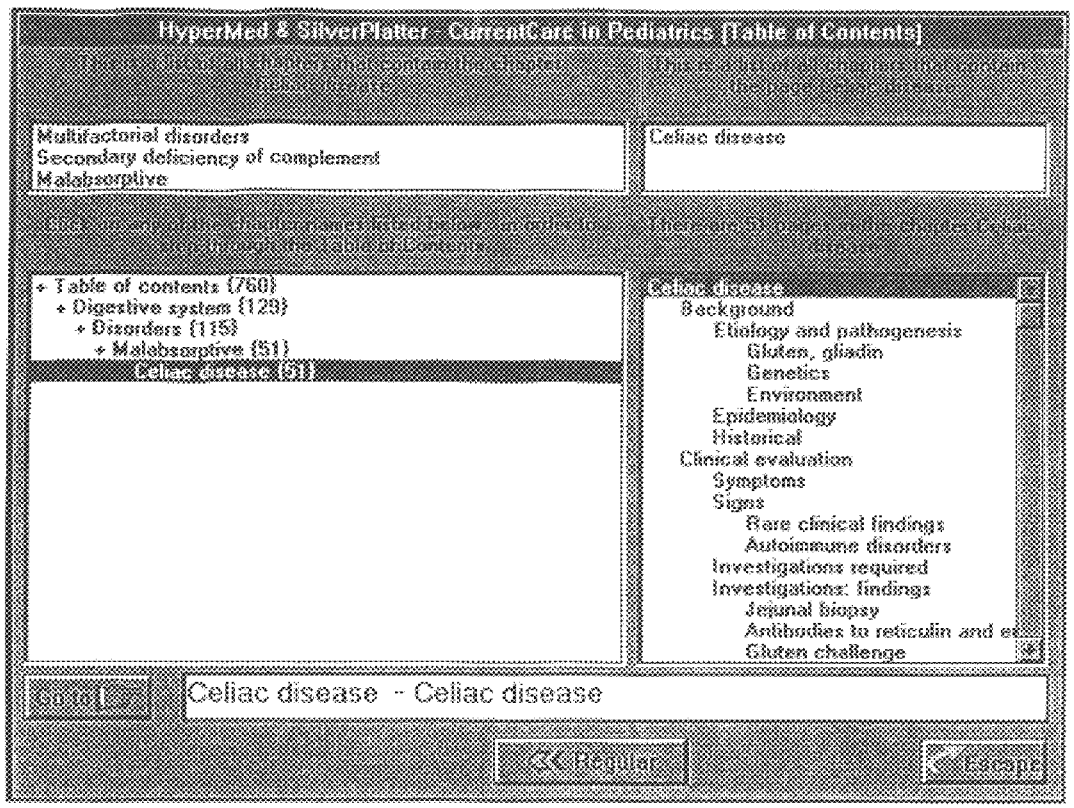

The database stores and maintains a table of contents for the chapters, subchapters and pages, a portion of which is shown in FIG. 5. The portion of the table of contents shown in FIG. 5 represents the part shown after a user clicks on the Table of Contents icon in the toolbar of the screen display shown in FIG. 4. The page "Celiac disease" is shown in the right hand side of the table of contents, as well as other pages below it in the database hierarchy, wherein one indent inward signifies one level down in the hierarchy.

Thus "the pages "Background" and "Clinical Evaluation" are one level down in the hierarchy from the "Celiac disease" page. The left side of the table of contents shown in FIG. 5 shows the chapter/subchapter hierarchy starting with the top level (Table of Contents), down one level to the chapter "Digestive system", down another level to the subchapter "Disorders", down another level to a further subchapter "Malabsorptive", and finally down to the subchapter "Celiac disease". The connections in the database between the page "Celiac disease" and the subchapter "Celiac disease" as well as for the other pages and chapters are as explained above with reference to FIG. 3.

Figure 6:
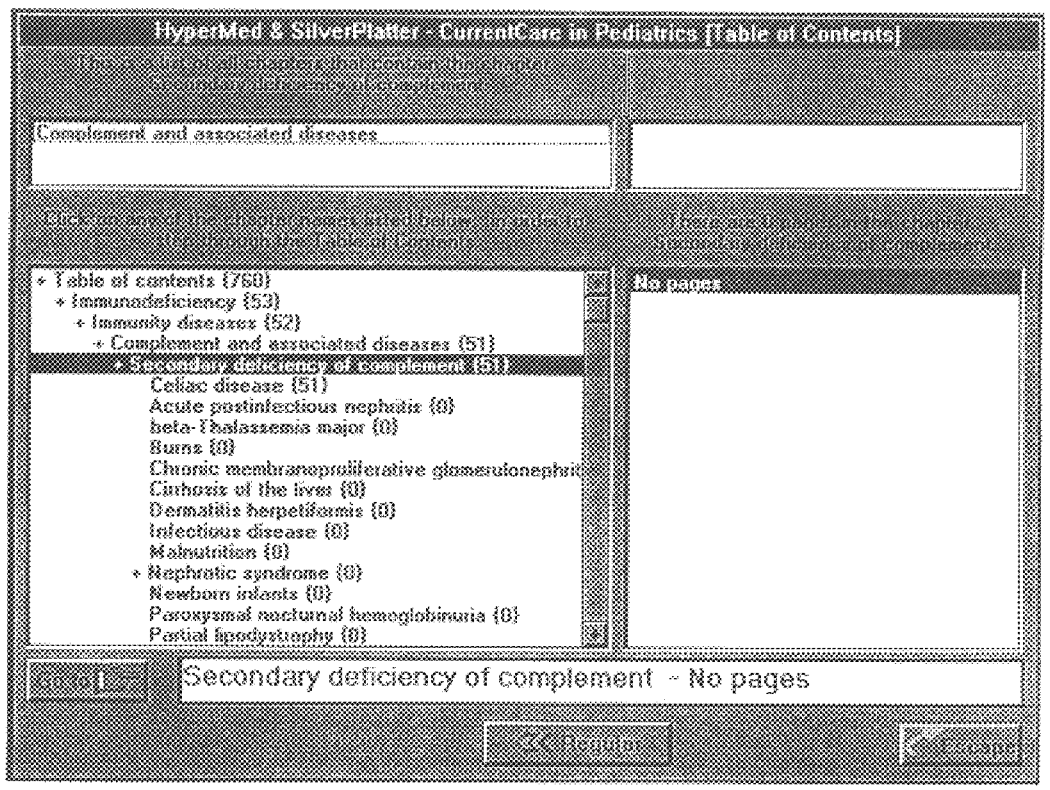

Above the left hand side of the table of contents is a window box showing the multiple parents for the subchapter "Celiac disease", i.e., "Malabsorptive", "Multifactorial disorders", and "Secondary deficiency of complement". The subchapter "Malabsorptive" is the default parent chapter for the subchapter "Celiac disease", that is, the chapter which is listed as the parent chapter unless a user selects otherwise. The identity of the default parent chapter is stored in the Screen table as shown in FIG. 3. By selecting one of the other parents from the list of multiple parent chapters, a user can immediately jump to that other chapter, as shown in FIG. 6, which shows the table of contents illustrated after selecting the multiple parent "Secondary deficiency of complement".

The screen displays in FIGS. 7–8 show additional pages illustrating the data structure described above.

As shown in FIGS. 4, 7, 8, and 15, the database contains numerous hypertext links, represented by underlined words or phrases in the text. Clicking on these hypertexted word or phrases causes the computer to display a target screen containing information which relates to the hypertexted word or phrase.

The database relationship chart in FIG. 3 illustrates the implementation of structured focused hypertext of the present invention. The database contains a number of Hypertext Nodes or data records 34 which store information regarding hypertext links, including a unique Node ID and the identities of the paragraph (Paragraph ID) which contains the hypertexted word or phrase and of the target screen (Target Screen ID). The one-to-many relationship between the Paragraph ID field in the Paragraph table and the Paragraph ID field in the Hypertext Nodes indicates that a number of paragraphs can be linked to one screen. Similarly, the one-to-many relationship between the Screen ID # field in the Screen table 28 and the Target Screen ID field in the Hypertext Nodes 34 indicate that a one-to-many relationship exists and that a single paragraph can be hypertext linked to a number of different target screens via different hypertexted words or phrases in the paragraph.

The links between the Hypertext Nodes and other elements of the database structure facilitate structured focused hypertext in the following manner. The link between the identity of the paragraph in the Hypertext Nodes and the Paragraph table 22 allows the computer system to access through the hypertext nodes any information about the paragraphs stored in the database, such as the type of paragraph and the identity of the source screen containing the paragraph. The link between the identity of the target screen in the Hypertext Nodes and the Screen table 28 allows the system to access through the hypertext nodes any information about the target screen which is stored in the database, such as the identity of and types of information contained within the paragraphs contained within the screen, which can be accessed by following the links through Screen Table 28 and Link Table 24 to the Paragraph table 22.

The relative positions within the hierarchy of the source screen containing the paragraph containing the hypertexted word or phrase and the target screen can be determined at the Hypertext Nodes. Thus, it can be determined whether the source and target screen are located within the same chapter or within different chapters, using the default parent chapter for any screen having multiple parent chapters, as explained above. It can also be determined whether the source or target screens are directly linked in the database and whether they are positioned above one another in the database hierarchy. Other information about the source and target screens and their relationships to one another can be determined, as will be clear to one skilled in the art from database relations shown in FIG. 3 and from the source code in the Source Code Appendix.

This information can be used in at least two ways. First, the system can inform the user of any desired information about the source screen, target screen, or their relationship to one another by providing a visual indication in the hypertext indicator of that information. Thus, in the preferred embodiments, the user is informed of the existence of a hypertext link by an underline under the hypertexted word or phrase. See FIGS. 4, 7, and 8. The type or category of hypertext link, as determined by information accessed through the Hypertext Node, can be conveyed to the user by color coding the underlining according to a predetermined legend. These hypertext node types associated with the color coding are stored in a Nodes' types table 36 (FIG. 3), which is linked in a one-to-many relationship to the Type field in the Hypertext Nodes 34. The system can automatically determine the proper color coding based on the node type, and the node types can be automatically and dynamically updated after the hierarchy of the data structure is changed or after the type of content in a paragraph is changed to reflect these changes.

Color copies of FIGS. 4, 7, and 8 have been submitted to best illustrate the color coding scheme of the preferred embodiment of the present invention. In the preferred embodiment of the invention as implemented in the CurrentCare™ product, the hypertext node types convey the following information: whether the target screen is in the same chapter as the source screen (indicated by navy blue underline); whether the target screen is in a different chapter than the source chapter (indicated by a green underline); whether the information contained in the target screen is unavailable in the current version of the database (indicated by a light blue underline and determined either by a separate database table storing that information or by accessing the Paragraph body text field in the Paragraph table 22); whether the target screen contains a graphical image (indicated by a pink underline and determined by accessing the Paragraph body text field in the Paragraph table 22); and whether the target screen contains a utility application such as a pharmacology calculator, or a growth or development chart (indicated by a red underline and determined by access to a table storing utility application types which is linked to the Paragraph table (link not shown)).

Thus, with reference to FIG. 4, the hypertext link to the words "Background", "gluten," etiology" and other words or phrases underlined in navy blue underlines connect to target screens located within the same chapter, and thus the user knows in advance that making these hypertext jumps will keep him within the same chapter. Clicking on the hypertexted words "flattening of mucosal villi" and "pot belly" will bring up a target screen containing at least a picture of the respective phenomena, and the user knows in advance that he will see such a picture. With reference to FIG. 8, a user knows in advance from the red underlining that selecting the hypertexted heading "Growth charts" will bring up a growth chart utility application, and that selecting "Down's Syndrome" will bring up a page in another chapter in the database relating to Down's Syndrome, and not more specific information regarding celiac disease. Similar functionality can be seen in the other hypertexted text in FIGS. 4, 7, and 8.

One skilled in the art will recognize that many other variations of node types are possible to display any desired information to a user which can be accessed from the database, and that multiple node types can be displayed in the same hypertext by, for example, showing lines which are half one color and half another to indicate two node types and thus two bits of information about the source screen, the target screen, or their relationship in the hierarchy.

A second use of the Hypertext Nodes is in quality control of the data structure. A desired quality control is based on a given philosophy of database design which results in a list of protocols which must be satisfied by the data structure. For example, in order to provide a way for a user to access information in a focused, hierarchical manner, the data structure must satisfy a protocol providing that every page has at least one link into each of its subpages. Thus, a user can progressively access screens downwardly in the database hierarchy towards increasingly specific information about a topic by use of the hypertext links alone, without the need to scroll down pages, perform keyword searching, or consult an index or table of contents.

Other types of quality control testing which is made possible by the use of hypertext nodes as described herein include tests for the following protocols or conditions:

1. Every page should have at least one hypertext link out to a target screen;
2. The average number of hypertext links in the pages should reach or exceed a desired minimum so that hypertext serves as a primary search tool of the database;
3. Each page should have at least one link in or out which goes, directly or indirectly, to a main or overview page through which the database is accessed—this prevents a set of pages from self-contained and circular group with hypertext links that only refer to other pages in the group and which has no hypertext entry or exit point;
4. Every identified unit of knowledge in a page, such as a word or phrase which represents a concept or topic (such as celiac disease or short stature), has a hypertext link to at least one page devoted to that concept or topic or discussing that topic in detail. This ensures that users will generally be able to find more specific information about any concept or topic.

Other protocols which should be tested for during quality control testing in the data structure described herein include the following:

1. Every page with multiple parent chapters should have a default parent chapter;
2. All the chapter names should be unique, and synonyms for chapter names used to enhance searching and indexing of chapters should not contradict;
3. Every chapter has a contribution page which lists the names of the authors of the content contained in that page;
4. Every page should be linked in the database to the table of contents so that it can be found in the table of contents;
5. Every chapter should be assigned a chapter type;
6. The subchapters should be nested within the hierarchy only one level at a time, and no subchapter should be linked in the database directly to a page or subchapter more than one level below it in the hierarchy.

One skilled in the art will recognize that many other types of protocols can be tested for in quality control using the data structure of the present invention.

To increase the benefits of the structured focused hypertext and multiple parent data structure of the present invention, it may be advantageous to add specific pages designed to serve as links between two parallel chapters of different types (e.g., disease vs. problem) or between a chapter and smaller chapters within it. For two chapters of different types, such as a chapter on celiac disease (disease type) and on short stature (problem type), the subject matter of which is related in that celiac disease is one of the many causes of short stature, a reference page is made which discusses the relation between these two topics. The reference page is a child to both chapters, except that a different title is assigned depending on whether is it entered via hypertext linking from the chapter on Celiac disease (i.e., "Celiac disease—Short stature") or from the chapter on Short stature (i.e., "Short Stature—Celiac disease").

For a link between a chapter and smaller chapters within the chapter, a top or summary page is designed for the subchapter which contains many hypertext links and which is the target of many hypertext links from the chapter.

The possibility of creating special purpose pages such as those described above which are specifically designed to facilitate access from one page or chapter to another through associative thinking demonstrates additional advantages to the structured focused hypertext and multiple parent data structure of the present invention.

Figure 9:
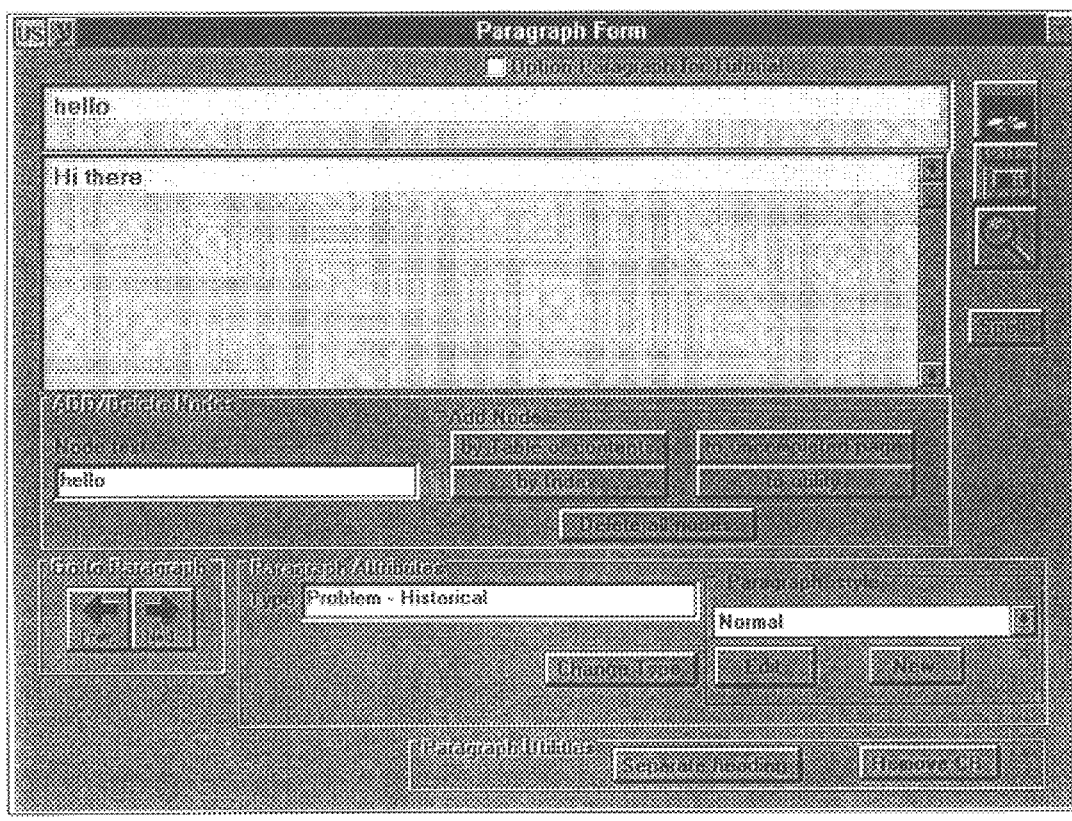

FIGS. 9–14 show screens displayed to a developer or author during the creation and editing of the data structure of the present invention. FIG. 9 shows a "Paragraph Form" screen, in which the parameters for the paragraphs including those stored in the Paragraph table 22 (FIG. 3) fields, such as paragraph type, paragraph body, paragraph style, etc. The hypertext links are established by highlighting the text which is to be linked, and by selecting the nature of the link in the Add Node section of the screen, including by linking to another page by jumping out to the table of contents and finding it in the data structure hierarchy, by finding it in an index, by linking it to an uncompleted page (resulting in automatic placement of light blue underlining of hypertext by system), and by linking it to a utility application (resulting in automatic red underline).

Figure 10:
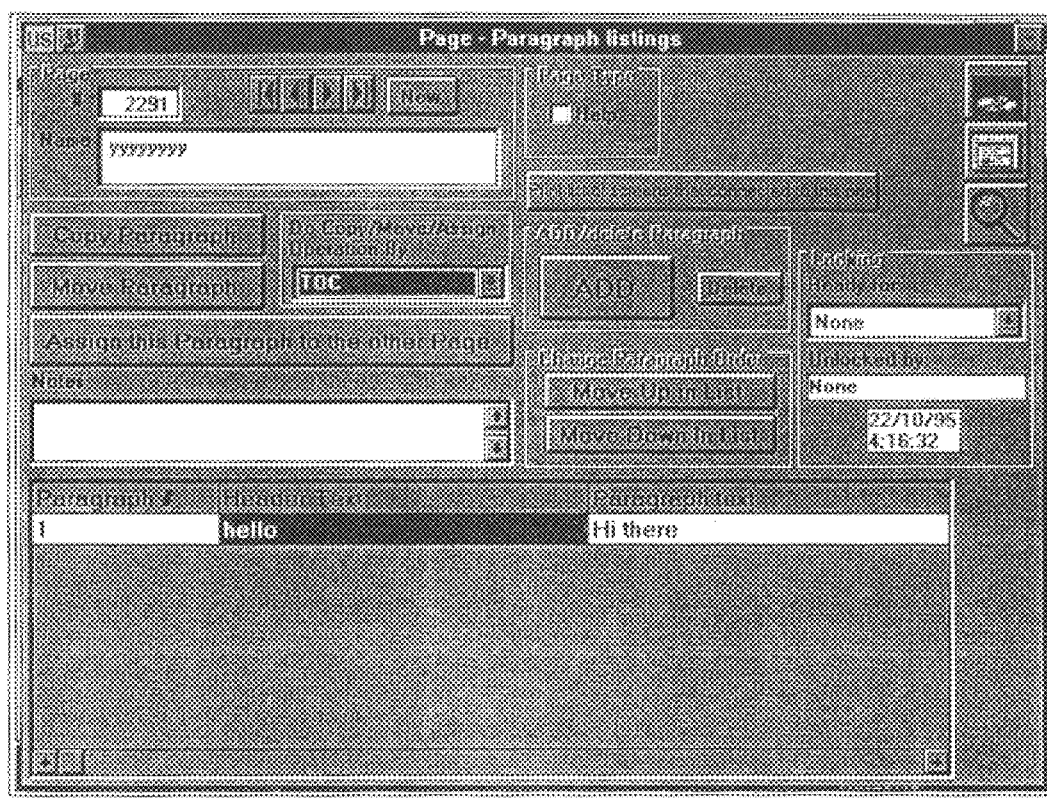

FIG. 10 shows a "Page—paragraph listings" screen which allows developers to create and edit the structure of a page. Paragraphs can be copied or moved from another page, in which case new paragraph entities will be created in the data structure.

Alternatively, a paragraph can be "assigned" to another page, in which case a multiple parent relationship is established between the paragraph and the two parent pages to which it is linked, and no additional copy of the paragraph need be created or stored in the database. This screen also allows users to change the order of paragraphs on a screen and to add and delete paragraphs.

Figure 11:
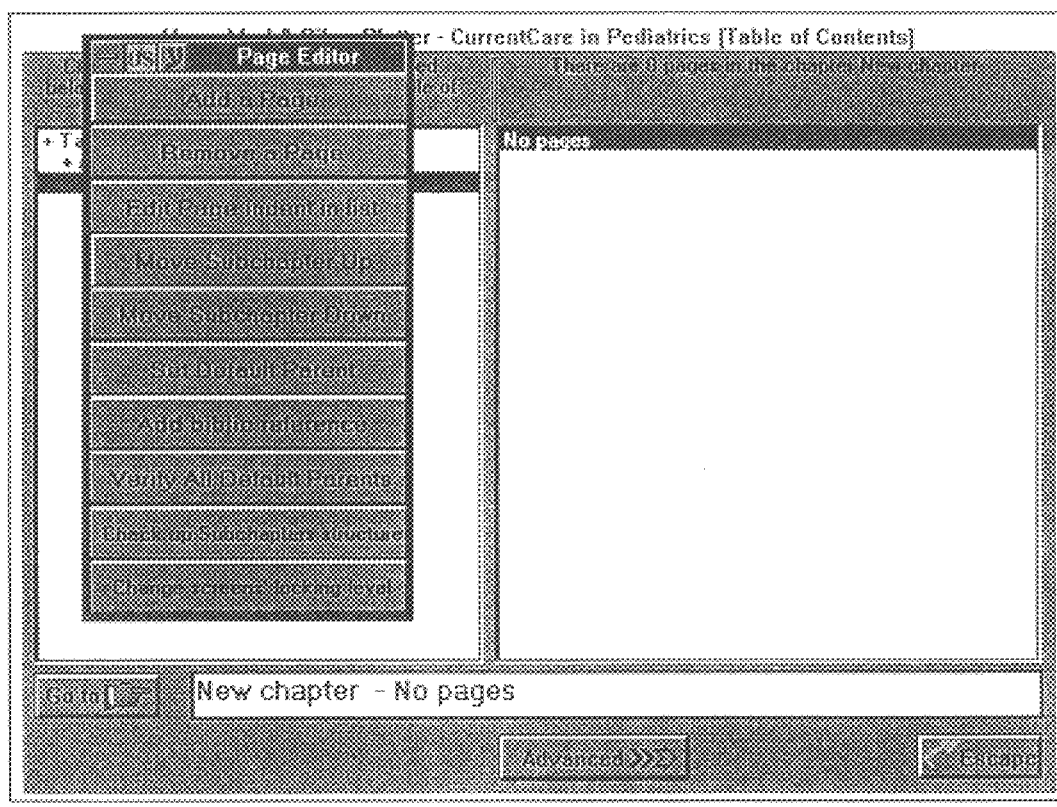

FIG. 11 is a "Page Editor" screen which allows for the placement of pages within the data structure hierarchy. The hierarchy is shown in the table of contents, and a page can be added or removed from the hierarchy or moved up or down within the hierarchy. The default for a page having multiple parent chapters can be set in this screen. This screen also provides for some of the quality control testing described above relating to pages, such as verifying default parents and checking subchapter structure.

Figure 12:
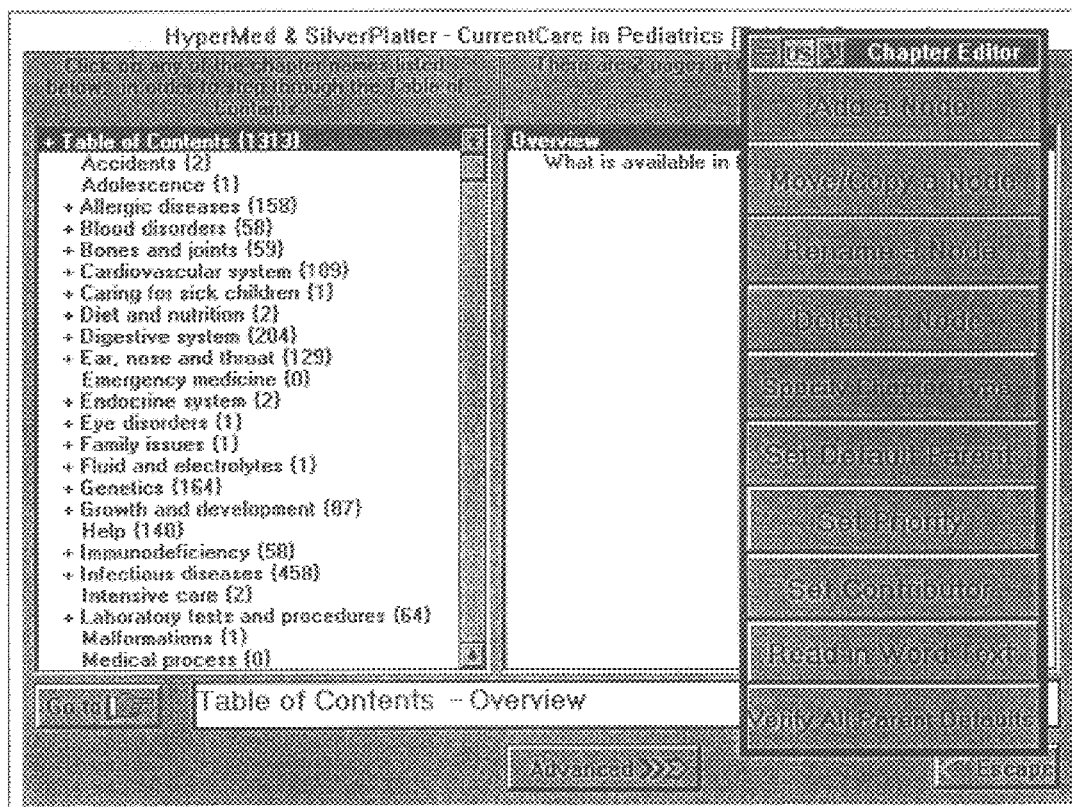

FIG. 12 is a "Chapter Editor" screen similar in function and appearance to the "Page Editor" screen. This screen allows for the setting of certain parameters relating to chapters and stored in the Table of Chapters 32 (FIG. 3), including chapter type and contributor screen. This screen also allows for the placement of a chapter within the hierarchy (this screen as well as the screens shown in FIGS. 13 and 14 refer to chapters as "nodes"). Thus, a chapter may be added to the hierarchy, moved or copied within the hierarchy, renamed, or deleted from the hierarchy.

Figure 13:
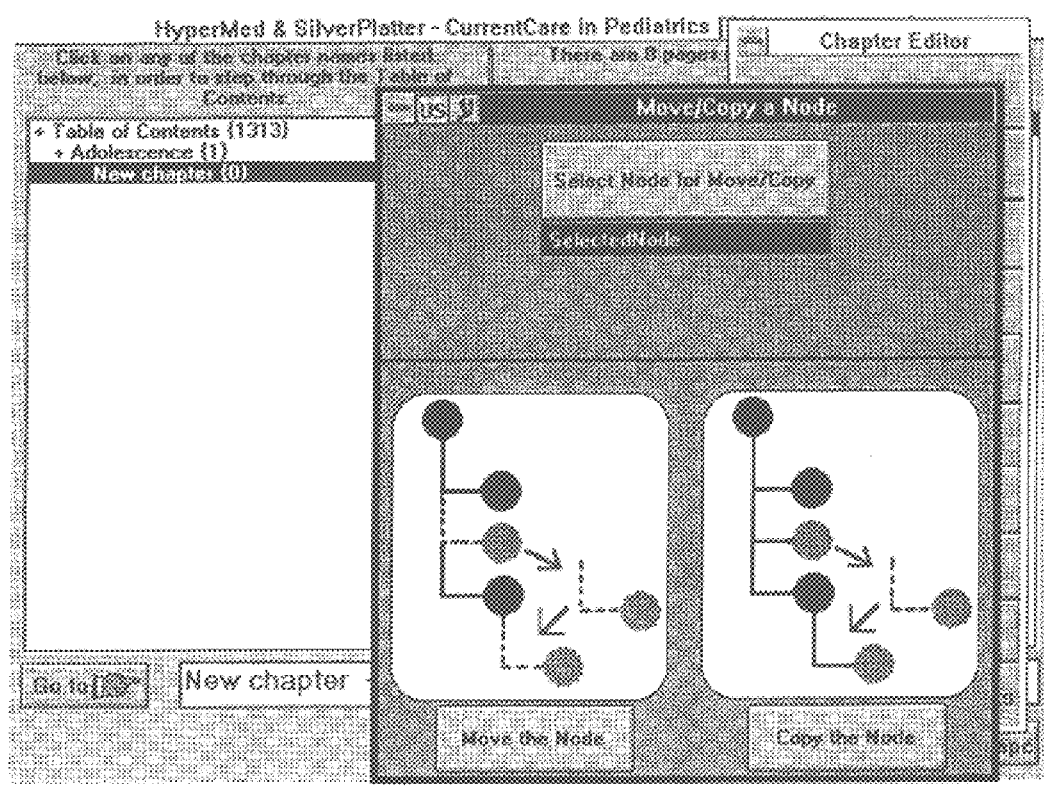
Figure 14:
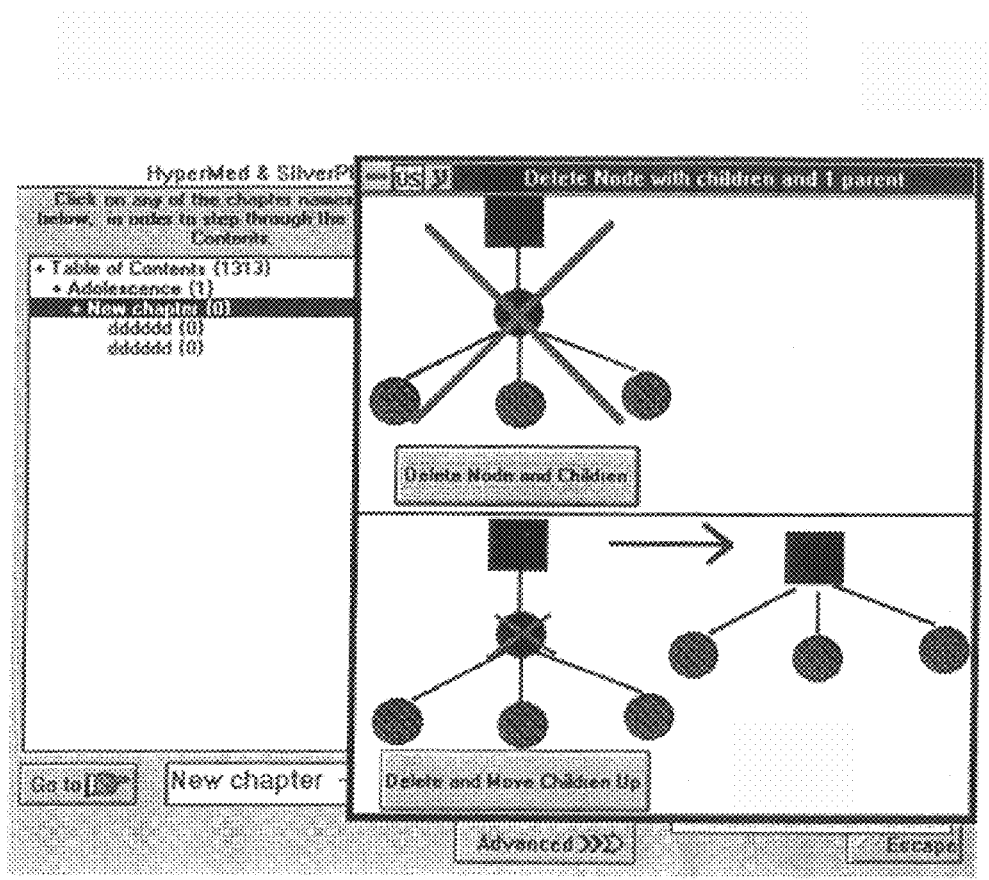
Figure 15:
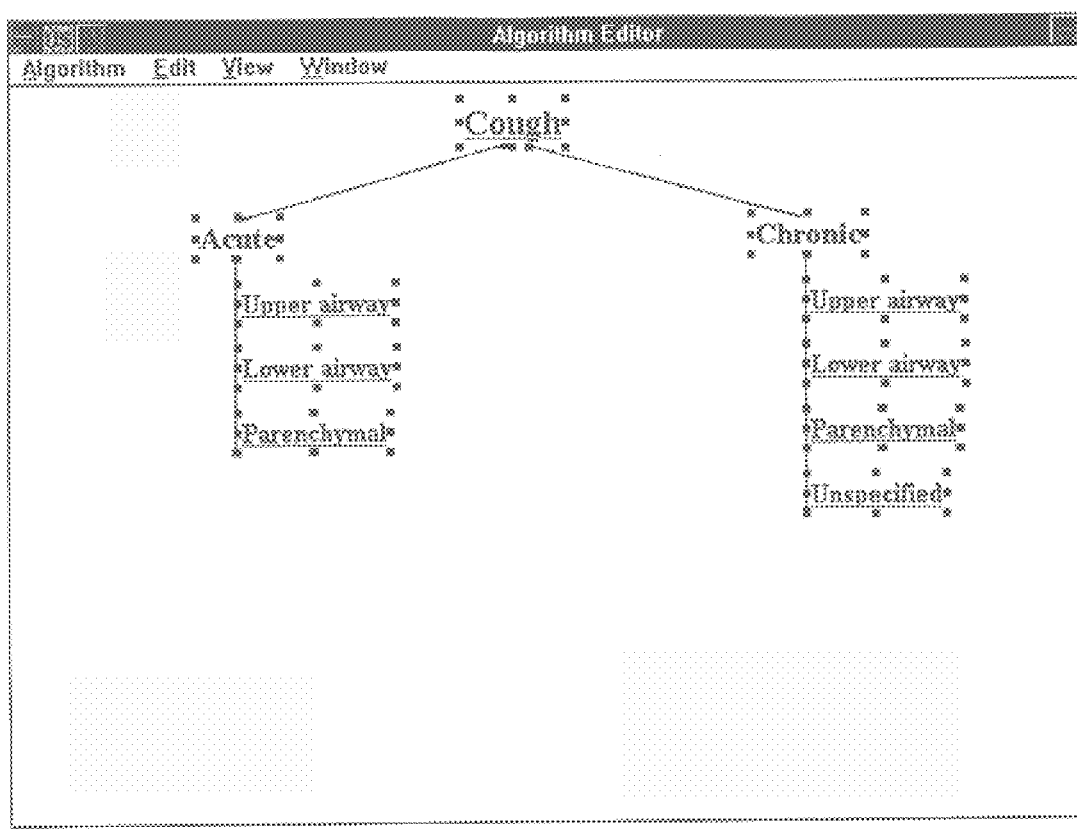
FIG. 15 is an "Algorithm Editor" screen display of a preferred embodiment of the present invention.

If a chapter is to be moved or copied, the screen "Move/Copy a Node" in FIG. 13 is displayed. This screen contains a graphical representation of the move and copy functions. If a chapter is to be deleted from the hierarchy, the user is given the choice in the screen display "Delete Node with children and 1 parent" shown in FIG. 14 of deleting the chapter and all the child chapters and/or pages contained within it, or of deleting the chapter and moving the children of the chapter one level up in the hierarchy.

The data structure of the present invention, in which the hypertext nodes store information regarding or linked in the database to the source and target screens, provides for the capability for the system to automatically and dynamically update the hypertext nodes in response to changes in the hierarchy. Thus, if, for example, information is changed in a paragraph, a paragraph is moved to a different page, a page is moved to a different chapter, or a chapter is moved to a different level in the hierarchy, the hypertext nodes can automatically reflect these changes without the need for manual adjustment or update to the information in the nodes.

An algorithm is a particular type of paragraph in which text is organized in chart form. See the "Algorithm Editor" screen display shown in FIG. 15 as an example. Because they contain text, algorithms can provide for hypertext links both inwardly from other screens (as can all paragraph types) and outwardly to other screens. Algorithms are stored and organized in a set of database files, shown in FIG. 3, whose structure is highly similar to the structure of the paragraph/screen data structures described above and also shown in FIG. 3. The algorithm files are linked to their own set of Hypertext Nodes, FIG. 3, which is organized and linked to the algorithm database files in fashion similar to the fashion in which the Hypertext Nodes are linked to the other paragraph type files.

FIG. 16 shows a "Paragraph Form" screen display for algorithms which allows for the assignment or deletion of an algorithm into the algorithm data structure in much the same fashion in which other types of paragraphs are assigned and deleted, as described above. As with other hypertext nodes, hypertext nodes for algorithms can be automatically and dynamically updated to reflect changes in the algorithm database structure.

The Source Code Appendix contains computer program listings for a program which provides at least some of the above described functionality of a system using the data structure of the present invention as well as additional database links not represented in the relationship chart of FIG. 3 (in the *.BAS files), and the code which underlies some of the screen displays shown in the figures as well as other screen displays used by the system (in the *.FRM files).

While the invention has been described and illustrated in connection with preferred embodiments, many variations and modifications as will be evident to those skilled in this art may be made without departing from the spirit and scope of the invention, and the invention as set forth in the appended claims is thus not to be limited to the precise details of methodology or construction set forth above as such variations and modification are intended to be included within the scope of the appended claims.

SOURCE CODE APPENDIX

See separate volumes of Source Code Appendix, Volumes I, II, and III, pages A1–A922.

What is claimed is:

1. A hypertexted data structure stored on a computer readable memory device and organized in a hierarchy of at least two levels, the data structure comprising:
  a plurality of data units positioned at different levels in the hierarchy, each containing at least some textual information;
  a plurality of hypertext links each linking at least part of the textual information in a given source data unit to a target data unit; wherein:
    at least one of the hypertext links is linked to at least one hypertext node which contains information relating at least to both the given source data unit and the target data unit; and
    said information enables a user of a display device connected to a computer reading the memory device to determine the relative positions in the hierarchy of the given source and target data units linked by the hypertext link; and
  a plurality of hypertext node types each linked to a respective hypertext node, the hypertext node types including at least one of the following node types:
    (a) a node type linked to each hypertext node determined by the relative positions of the given source data unit and target data unit;
    (b) a node type linked to each hypertext node determined by the presence of graphics in the given source data unit, in the given target data unit, or in both the given source and target data units; and
    (c) a node type linked to each hypertext node determined by the presence of a utility application in the given source data unit, in the given target data unit, or in both the given source and target data units.

2. The data structure of claim 1, wherein:
  the at least one hypertext node comprises a data record in a database file.

3. The data structure of claim 1, wherein:
  each of the at least one hypertext nodes comprises a file.

4. The data structure of claim 1, wherein:

the hypertext node types comprise a set of visual indicators to be displayed on the display device; and each visual indicator represents a different node type.

5. The data structure of claim 4, wherein:

the visual indicators are different colors to be displayed in association with textual information to be displayed at least as part of the respective data unit.

6. The data structure of claim 1, wherein:

the data units comprise pages and chapters, each chapter being linked to one or more of the pages.

7. The data structure of claim 6, wherein:

at least one of the hypertext links links each chapter to each of the one or more pages linked to that chapter.

8. The data structure of claim 6, wherein:

at least one of the pages is simultaneously linked to two or more of the chapters, one chapter of which is labeled as a default chapter for the at least one page.

9. The data structure of claim 6, wherein:

the data structure is organized in a hierarchy of at least three levels;

the data units further comprise paragraphs, each paragraph being linked to one or more of the pages; and at least one paragraph is simultaneously linked to two or more pages.

10. A hypertexted data structure stored on a computer readable memory device and organized in a hierarchy of at least two levels, the data structure comprising:

a plurality of data units positioned at different levels in the hierarchy, each containing at least some textual information;

a plurality of hypertext links each linking at least part of the textual information in a given source data unit to a target data unit; wherein:

at least one of the hypertext links is linked to at least one hypertext node which contains information relating at least to both the given source data unit and the target data unit; and said information enables a user of a display device connected to a computer reading the memory device to determine the relative positions in the hierarchy of the given source and target data units linked by the hypertext link; and a plurality of hypertext node types, each linked to a respective hypertext node, the hypertext node types including a node type linked to each hypertext node determined by the presence of graphics in the given source data unit, in the given target data unit, or in both the given source and target data units.

11. The data structure of claim 10, wherein:

the hypertext node types comprise a set of visual indicators to be displayed on the display device; and each visual indicator represents a different node type.

12. A hypertexted data structure stored on a computer readable memory device and organized in a hierarchy of at least two levels, the data structure comprising:

a plurality of data units positioned at different levels in the hierarchy, each containing at least some textual information;

a plurality of hypertext links each linking at least part of the textual information in a given source data unit to a target data unit; wherein:

at least one of the hypertext links is linked to at least one hypertext node which contains information relating at least to both the given source data unit and the target data unit; and said information enables a user of a display device connected to a computer reading the memory device to determine the relative positions in the hierarchy of the given source and target data units linked by the hypertext link; and a plurality of hypertext node types, each linked to a respective hypertext node, the hypertext node types including a node type linked to each hypertext node determined by the presence of a utility application in the given source data unit, in the given target data unit, or in both the given source and target data units.

13. The data structure of claim 12, wherein:

the hypertext node types comprise a set of visual indicators to be displayed on the display device; and each visual indicator represents a different node type.

* * * * *